(12) United States Patent
McCombs et al.

(10) Patent No.: US 9,188,035 B2
(45) Date of Patent: Nov. 17, 2015

(54) METHOD AND CONTROL SYSTEM FOR A VALVE

(75) Inventors: Aaron McCombs, Peoria, IL (US); Jerry Kosner, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1298 days.

(21) Appl. No.: 12/940,594

(22) Filed: Nov. 5, 2010

(65) Prior Publication Data

US 2012/0110985 A1 May 10, 2012

(51) Int. Cl.
| | |
|---|---|
| F01N 1/00 | (2006.01) |
| F01N 3/00 | (2006.01) |
| F01N 3/025 | (2006.01) |
| F02M 25/07 | (2006.01) |
| F02D 9/04 | (2006.01) |

(52) U.S. Cl.
CPC ........... *F01N 3/025* (2013.01); *F02M 25/0709* (2013.01); *F01N 2240/20* (2013.01); *F02D 9/04* (2013.01); *Y02T 10/121* (2013.01)

(58) Field of Classification Search
CPC ..... F01N 3/025; F01N 2240/20; F01N 1/166; F02D 9/04; F02M 25/0709; Y02T 10/121
USPC .................................................. 60/274, 324
See application file for complete search history.

(56) References Cited

U.S. PATENT DOCUMENTS

| | | | |
|---|---|---|---|
| 1,678,202 | A | 7/1928 | Shivers |
| 2,310,761 | A | 2/1943 | Daiger |
| 2,762,004 | A | 9/1956 | Shepardson |
| 4,392,468 | A * | 7/1983 | Kobashi et al. ............... 477/111 |
| 4,673,031 | A | 6/1987 | Wiemer |
| 5,012,168 | A | 4/1991 | Dara et al. |
| 5,501,201 | A | 3/1996 | Miyoshi et al. |
| 5,661,384 | A | 8/1997 | Glibbery |
| 6,298,835 | B1 | 10/2001 | Horie et al. |
| 2009/0313975 | A1 | 12/2009 | McCombs |
| 2010/0262356 | A1 | 10/2010 | Maruyama |

FOREIGN PATENT DOCUMENTS

| | | |
|---|---|---|
| JP | 02241963 | 9/1990 |
| JP | 200646641 | 2/2006 |
| JP | 2008138530 | 6/2008 |
| JP | 2009221905 | 10/2009 |

* cited by examiner

*Primary Examiner* — Thomas Denion
*Assistant Examiner* — Diem Tran
(74) *Attorney, Agent, or Firm* — Leydig, Voit & Mayer, Ltd.

(57) ABSTRACT

A method of controlling a valve and a control system in a machine having an internal combustion engine, the system including the valve and an associated motor, and a temperature sensor that supplies a temperature signal to a controller in electrical communication with the motor. The controller supplies a closing current to the motor at a temperature signal corresponding to a temperature no greater than a preset temperature parameter, the closing current being at or above a nominal operating current of the motor and being furnished for a preset period of time.

20 Claims, 4 Drawing Sheets

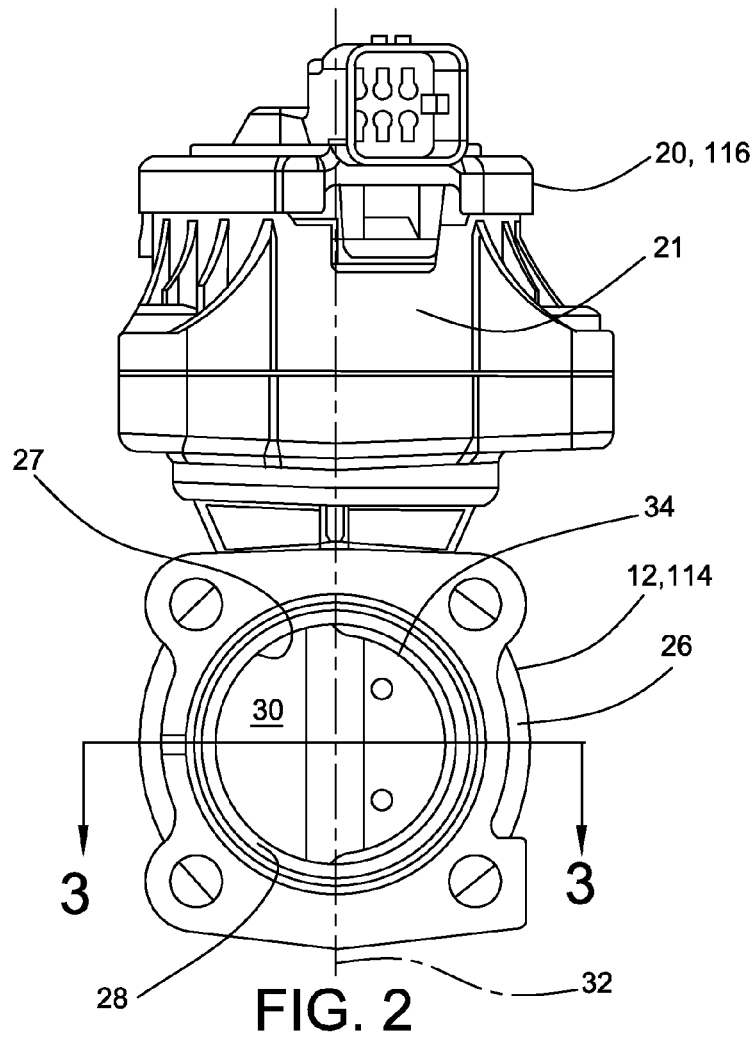
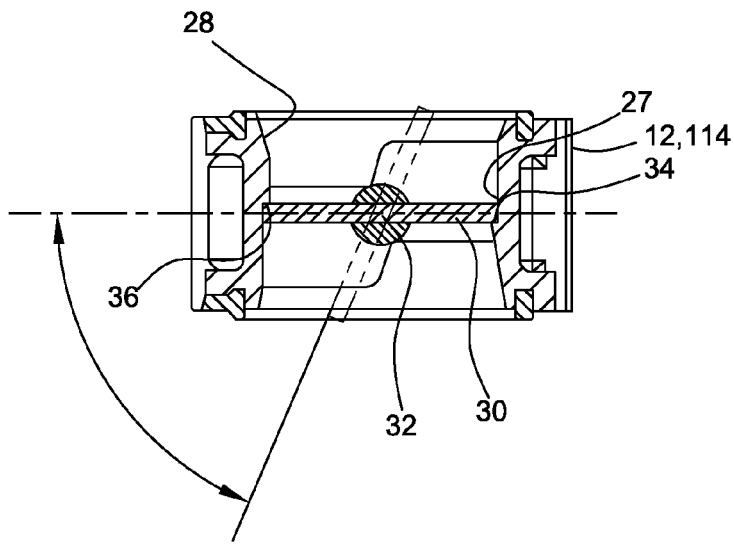
FIG. 2
FIG. 3

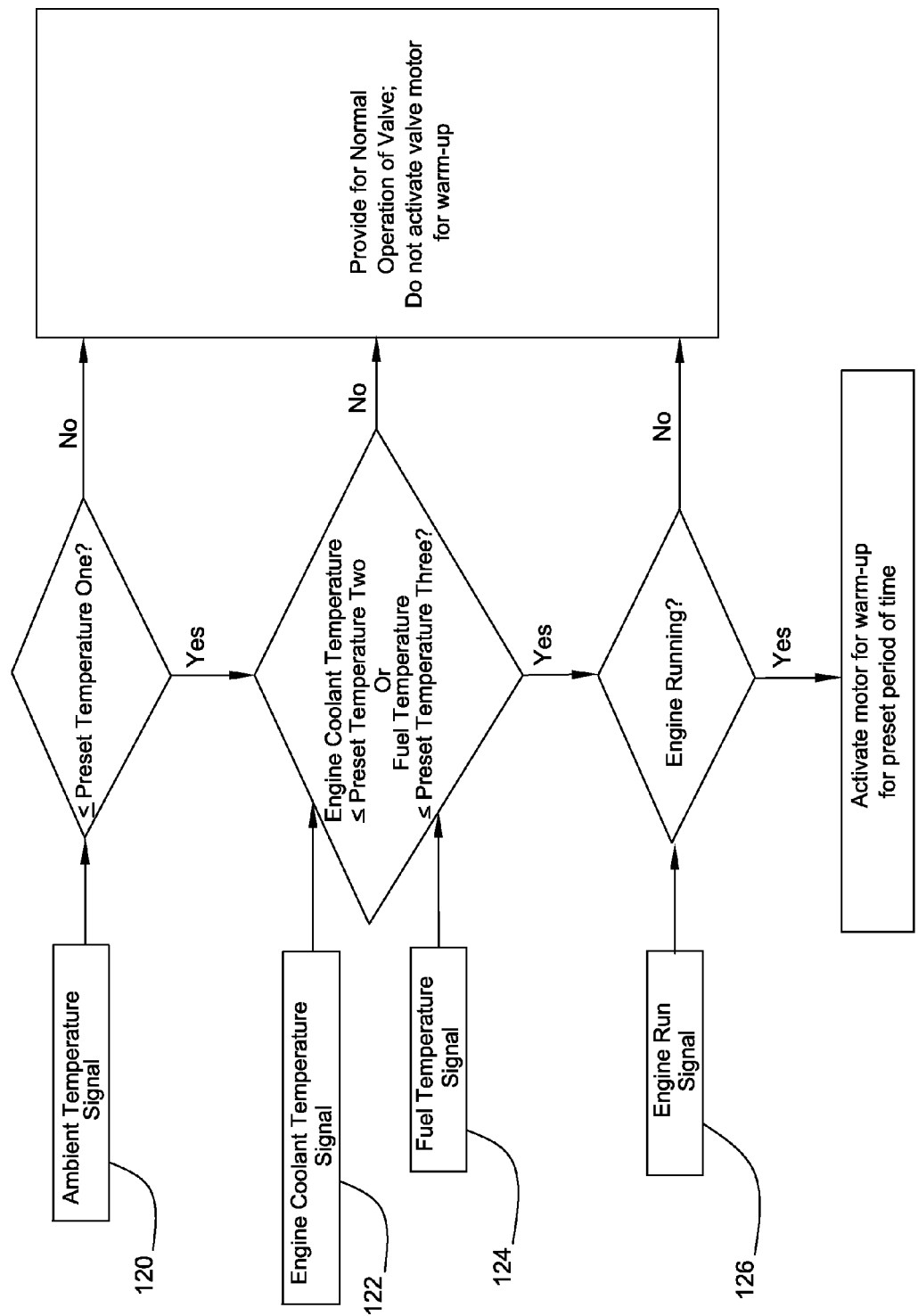

METHOD AND CONTROL SYSTEM FOR A VALVE

TECHNICAL FIELD

This patent disclosure relates generally to valves used in machines having combustion engines, and, more particularly to a control system and a method for warming a valve.

BACKGROUND

Valves are utilized within engines and associated equipment, such as exhaust regeneration systems, to control the passage of gas for various operations. In extremely cold weather, the viscosity of the grease and lubricant in a valve increases. This may dramatically slow the response time of the valve, resulting in inefficiencies and even error in associated systems. Air control valves are utilized, for example, to control the amount of combustion air supplied to burners for diesel particulate filters to facilitate combustion. As the response time of such combustion air valves becomes sluggish at low temperatures, the increased response time may result in a mixture that is too rich, inhibiting ignition, or even preventing an associated diesel particulate filter burner from lighting. Thus, when these machines are utilized in extremely cold conditions, the engine must typically be allowed to warm up before allowing diesel particulate filter regeneration.

Various methods have been proposed to reduce lubricant viscosity. U.S. Pat. No. 2,310,761 to Daliger for a refrigeration apparatus, for example, discloses a motor that contains a lubricant that is non-fluid or substantially solid at room temperature. Upon installation and powering of the unit, conditions are established such that a relatively high current flows through the motor winding to produce a relatively large quantity of heat. The heat generated by high current renders the lubricant fluid, allowing the rotation of the rotor, and the motor to run. While a stalled motor generating heat is generally viewed as undesirable, in this instance, the length of time that the motor is stalled is limited by the subsequent closing of a circuit that allows the entire winding to be energized and the motor to run in accordance with its normal operating characteristics.

SUMMARY

The disclosure describes, in one aspect, a control system in an internal combustion engine. The control system includes a valve, a motor coupled to the valve and operable to open and close the valve, a temperature sensor adapted to supply a temperature signal, and a controller. The controller is in electrical communication with the motor and is adapted to receive the temperature signal. Further, the controller is configured to supply a closing current to the motor for a preset period of time when the temperature signal is indicative of a temperature no greater than a given temperature parameter, the closing current being at or above the nominal operating current.

In another aspect of the disclosure, a method of controlling a valve in an internal combustion engine is provided. The method comprises the steps of providing a motor coupled to the valve, the motor being operable to open and close the valve, and sensing a temperature and supplying a temperature signal indicative of said temperature to a controller. The method further includes the steps of supplying a closing current to the motor for a preset period of time when the temperature signal is indicative of a temperature no greater than a preset temperature parameter, the closing current being at or above the nominal operating current In yet another aspect of the disclosure, a machine is provided having an exhaust gas regeneration assembly, a gas supply, and a valve disposed to control a flow of the gas supply to the exhaust gas regeneration assembly. A motor is coupled to the valve and is operable to open and close the valve. A temperature sensor is provided that is disposed and adapted to measure temperature within the machine, and supply a temperature signal indicative of the temperature to a controller in electrical communication with the motor, the controller being adapted to receive the temperature signal. The controller is configured to supply closing current to the motor for a preset period of time when the temperature signal is indicative of a temperature no greater than a given temperature parameter, the closing current being at or above the nominal operating current.

BRIEF DESCRIPTION OF THE DRAWING(S)

FIG. 2 is a front elevational view of an exemplary valve utilized in the system of FIG. 1.

FIG. 3 is a cross-sectional view of the valve of FIG. 2 taken along line 3-3.

FIG. 6 is a flow chart of an exemplary method for warming a valve according to the disclosure.

DETAILED DESCRIPTION

Reference will now be made to specific embodiments or features, examples of which are illustrated in the accompanying drawings. Generally, corresponding reference numbers will be used throughout the drawings to refer to the same or corresponding parts.

Figure 1:
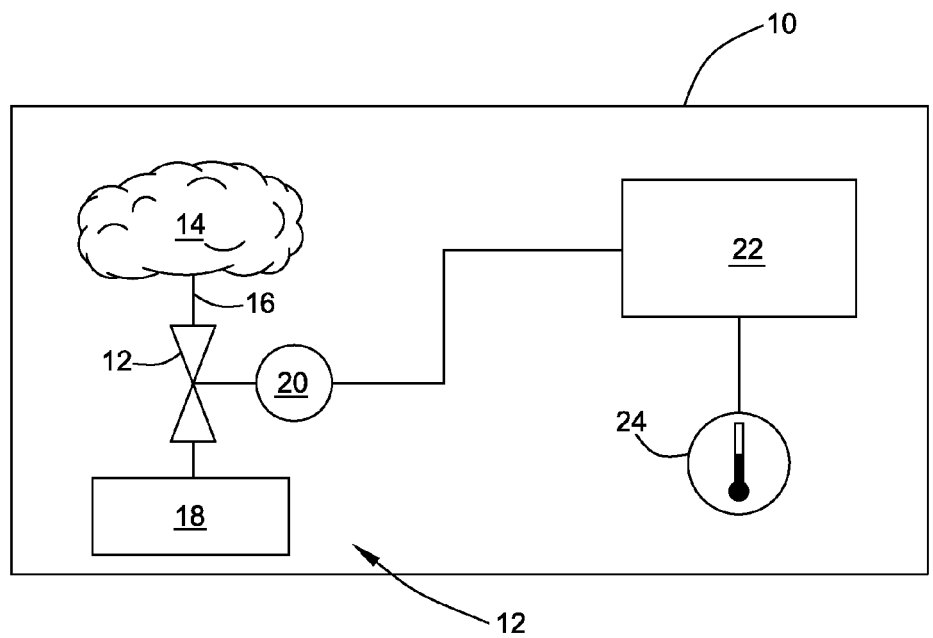
FIG. 1 is a schematic illustration of an exemplary embodiment of a control system according to the disclosure.

Turning first to FIG. 1, this disclosure relates to a control system and a method of controlling a valve of the machine 10. The arrangement disclosed herein has universal applicability in various types of machines 10. For example, the term "machine" may refer to any machine that performs some type of operation associated with an industry such as, for example, mining, construction, farming, transportation, or any other industry known in the art. By way of example only, the machine may be a vehicle, a backhoe loader, a cold planer, a compact loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other paving or underground mining equipment. Moreover, one or more implements may be connected to the machine 10. Such implements may be utilized for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, blades, rippers, scarifiers, shears, snow plows, snow wings, and others.

More specifically, the machine 10 includes a valve 12, which controls the flow of a fluid (not shown) from a fluid source 14 through a conduit 16 to a fluid destination 18 within the machine 10. The valve 12 is operated by a motor 20. The machine 10 further includes a controller 22 and a temperature sensor 24 disposed to determine a temperature.

The fluid may include any substance that is able to flow. The fluid may include matter in a liquid state, matter in a gaseous state, and matter in a vapor state. The fluid may include for example atmospheric air, exhaust gas, compressed air, fuel, a water based mixture, and oils.

The fluid source 14 may include, for example, the atmosphere, a tank, a pump, or other source of the fluid external to the valve 12 as would be known by one skilled in the art now or in the future. The fluid source 14 may include, by way of further example, a gas supply.

The conduit 16 may include any pipe, tube, or passage that would be known to one skilled in the art now or in the future through which a fluid, including a gas, may be conveyed from the fluid source 14 to the fluid destination 18. The conduit 16 may include, for example, metallic or plastic tubing.

The fluid destination 18 may be any body within the machine 10 disposed to receive a flow of fluid. By way of example only, the fluid destination 18 may be a combustion chamber, a manifold, or any other component into which flow of a fluid is regulated by a valve.

The temperature sensor 24 may include any device known by one skilled in the art now or in the future configured to generate a temperature signal indicative of the temperature of the valve 12, the machine 10, or the environment in which the machine 10 is disposed. The temperature sensor 24 provides the temperature signal that is indicative to the sensed temperature to the controller 22. The temperature sensor 24 may be disposed, for example, to supply a temperature signal indicative of the temperature of the valve 12, the fluid source 14, the motor 20, the fluid destination 18, surrounding ambient air, or other component, fluid, or gas. In varied embodiments, the temperature sensor 24 may be disposed, for example, at a position on an engine, on a fuel pump, on or in a fuel manifold, on a radiator or within a coolant, on a component of an after-treatment system, or on the valve 12 itself. Thus, the temperature sensor 24 is not limited to a particular position within the machine 10, so long as the temperature sensor 24 generates a temperature signal that is indicative of the relative temperature of the valve 12 or indicative of the environment in which the valve 12 operates. In this regard, a temperature signal indicative of another component or fluid within the machine 10 may likewise be indicative of the environment in which the valve 12 operates.

The controller 22 may include a processor (not shown) and a memory component (not shown). The processor may be microprocessors or other processors as known in the art. In some embodiments, the processor may be made up of multiple processors. The processor may execute instructions for control of the valve 12, such as the methods described below in connection with FIGS. 2 and 6. Such instructions may be read into or incorporated into a computer readable medium, such as the memory component or provided external to processor. In alternative embodiments, hard-wired circuitry may be used in place of or in combination with software instructions to implement the method disclosed herein. Thus, embodiments are not limited to any specific combination of hardware circuitry and software.

The term "computer-readable medium" as used herein refers to any medium or combination of media that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics, and can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer or processor can read.

The memory component may include any form of computer-readable media as described above. The memory component may include multiple memory components.

The controller 22 may be enclosed in a single housing, or it may include a plurality of components operably connected and enclosed in a plurality of housings. The controller 22 may be located on-board an engine, machine, or vehicle. In still other embodiments the controller 22 may be located in a plurality of operably connected locations including on-board an engine, on-board a machine or vehicle, and remotely.

The valve 12 may be any valve known to one skilled in the art now or in the future that may be operable to control the flow of gas from a fluid source 14 to a fluid destination 18. In an embodiment, the valve 12 may include a variable position valve operable to vary the size of an orifice the gas must flow through to enter the fluid destination 18. In another embodiment, the valve 12 may include a valve with two positions, opened and closed. By way of more specific example, the valve 12 may be an exhaust gas regeneration valve, or so-called EGR valve, a combustion air valve, or any other valve in which accurate operation of the valve may be at least partially dependent upon temperature. The valve 12 may be a normally open or a normally closed valve.

The motor 20 may be any motor known to one skilled in the art now or in the future that may be operable to control the position of a valve 12. In an embodiment, the motor 20 may be a stepper motor, for example.

Although they may be of any appropriate design, in an embodiment, the valve 12 and associated motor 20 may be as shown in FIGS. 2 and 3. In this embodiment, the motor 20 includes a motor housing 21 while the valve 12 includes a valve body 26. The valve body 26 presents an orifice 27 in a through passageway 28 in which a flap 30 is pivotably disposed to pivot about an axis 32 between closed and open positions, the motor 20 moving the flap 30 between the closed and open positions, or the open and closed positions.

In the closed position illustrated in FIGS. 2 and 3, the flap 30 is disposed against a pair of stops 34, 36, which, in combination with the flap 30, act to seal the orifice 27 to inhibit flow through the passageway 28. In use, the passageway 28 is disposed in line and fluid communication with the conduit 16 such that when the flap 30 is disposed in the closed position, the valve 12 prevents the flow of fluid through the passageway 28, and therefore conduit 16, if an effective seal is maintained. Conversely, when the flap 30 is pivoted to the position illustrated in phantom in FIG. 3, the valve 12 is open to the flow of fluid through the passageway 28. Thus, it is the relative position of the flap 30 within the passageway 28 that determines the open or closed position of the valve 12.

The valve 12 and motor 20 may be configured to generate a signal indicative of the valve position, which signal may be provided to the controller 22. Likewise, the valve 12 and motor 20 are operably coupled to the controller 22 to receive a valve actuation signal indicative of a desired valve position.

According to the disclosed control system 40, the temperature sensor 24 provides a signal indicative of the temperature of the valve 12 or the environment in which the valve 12 operates to the controller 22. If the temperature is determined to be adequate to provide for accurate operation of the valve 12 when the controller 22 receives a signal commanding operation of the valve 12, the controller 22 will cause the valve 12 to operate normally, that is the valve 12 will operate as directed by the controller 22 during normal operation of the machine 10.

In contrast, if the temperature signal indicates that the valve 12 is too cold to operate accurately, a negative current is supplied to the motor 20 for a period of time such that the motor 20 attempts to continue to rotate the already closed valve flap 30 toward the closed position, rather than the open position. As the flap 30 bears against the stops 34, 36, the motor 20 heats up the motor housing 21. This heat is transferred to the valve body 26 to heat the valve body 26 along with any associated lubricant, such as oil or grease (not shown) that may act to provide accurate operation of the valve 12. In order to prevent damage to the motor 20, the negative current is supplied to the motor 20 for a limited, preset period of time. Nominally, the components of the motor 20 itself, e.g., the windings (not shown), are rated to withstand an applied overload current for the preset period.

Figure 4:
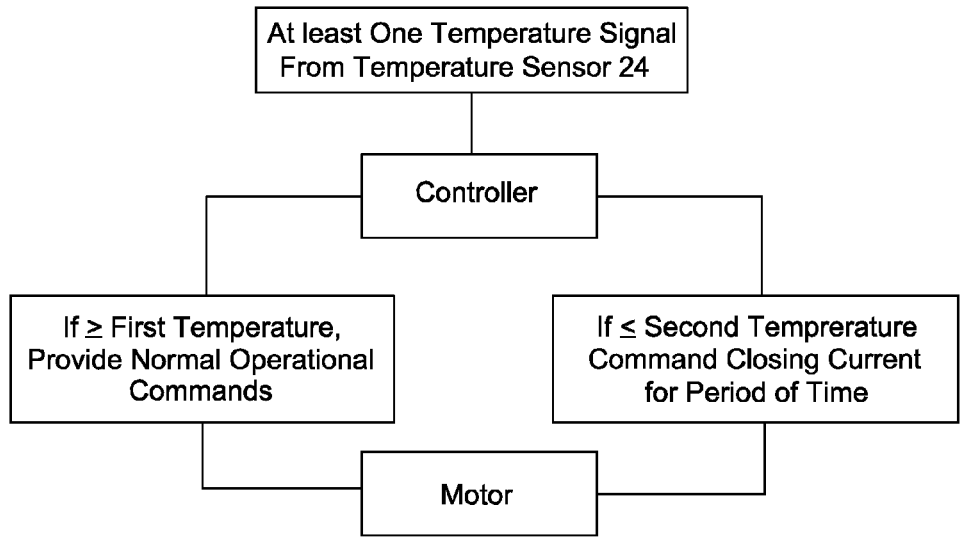
FIG. 4 is a flow chart of an exemplary method for warming a valve according to the disclosure.

Turning now to FIG. 4, a method of controlling the valve 12 is illustrated in the form of a flow chart. In operation, at least one temperature signal is provided from at least one sensor 24 to the controller 22. If the temperature indicated by the temperature signal is greater than or equal to a first, defined temperature parameter that defines a sufficiently warm valve, the controller 22 provides for a normal state of operation of the valve 12, that is, the controller 22 directs the provision of current to the motor 20 for normal operation based upon the type of valve 12 utilized. Conversely, if the temperature indicated by the temperature signal is less than or equal to a second, defined temperature parameter, that is, the valve 12 is deemed to be too cold for normal operation, a closing current at or above the nominal operating value for the valve 12 is supplied to the motor 20 for a preset period of time. The second closing current causes the motor 20 to attempt to pivot the flap 30 to bear against the stops 34, 36, causing the motor 20 to heat the motor housing 21, and valve 12. This heating of the valve 12 heats associated lubricant to facilitate accurate operation of the valve 12. The negative current is provided for a period of time that will not cause damage to the motor 20.

The preset period of time may be any appropriate time period that would allow for the warming of the motor housing 21 and associated valve body 26, but that would not cause damage to the motor 20 itself. In this regard, the period may include a single period of time, or a series of intervals wherein the controller 22 reevaluates the temperature signal to determine whether an additional warm up interval is appropriate.

Figure 5:
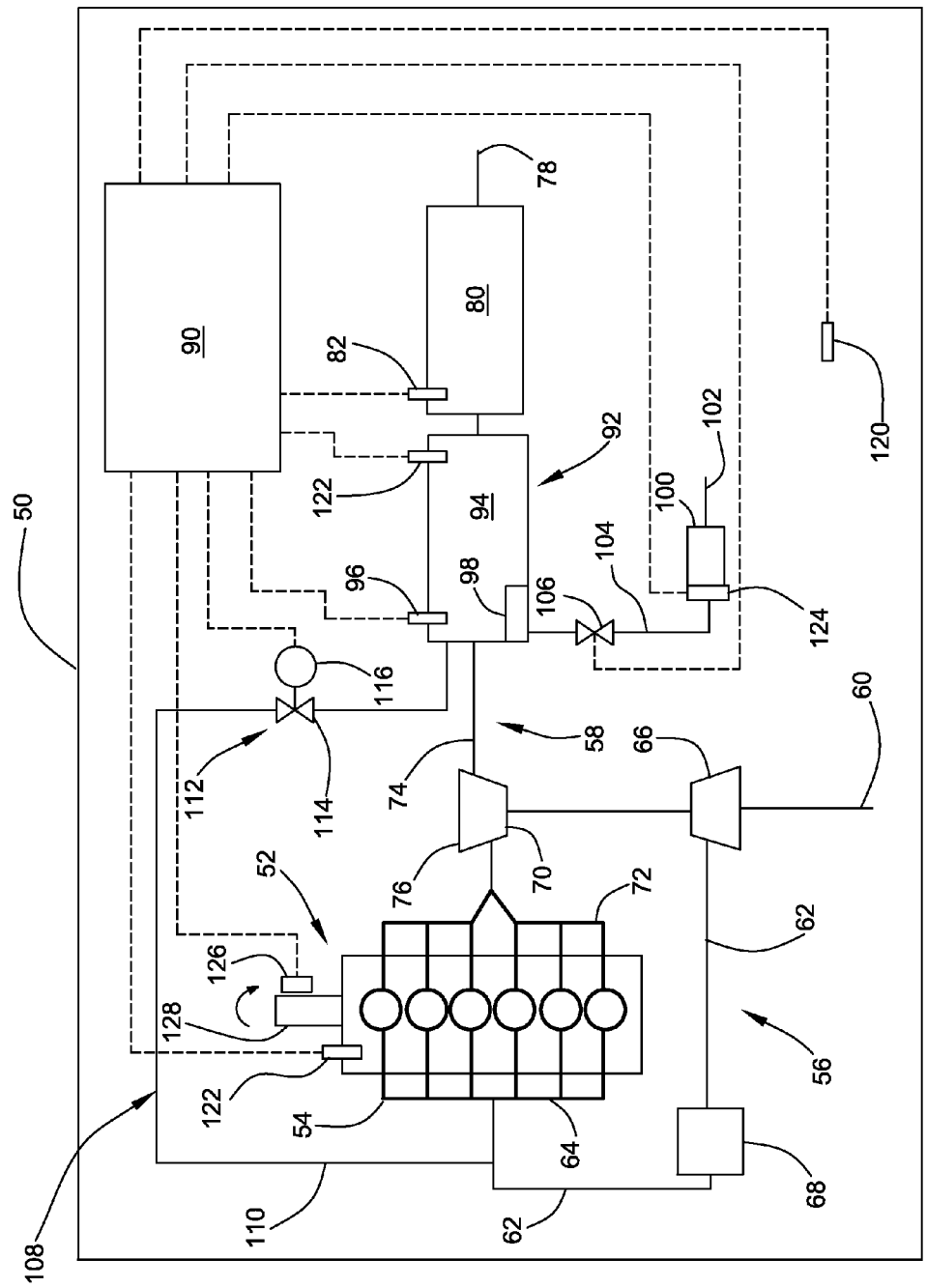
FIG. 5 is schematic illustration of an exemplary embodiment of a control system according to the disclosure.

FIG. 5 illustrates another exemplary embodiment of the arrangement. A machine 50 includes an engine system 52. The engine system 52 may include an engine 54 and various subsystems generally associated with an engine. Engine 54 may be any one of various types of engines, such as a combustion engine such as a gasoline fueled engine, a diesel fueled engine. Engine 54 may include, among other things, an air intake system 56 and an exhaust system 58, both diagrammatically illustrated in FIG. 5.

The air intake system 56 may include various components that are generally associated with engine air intake systems. For example, air intake system 56 may include an opening 60 for intake air drawn, for example, from the atmosphere. An intake air flow passage 62 may direct air from opening 60 to an air intake manifold 64, where the air may be channeled to one or more combustion chambers (not shown) in engine 54.

The air intake system 56 also may include a compressor 66 that may boost, i.e., compress, intake air above atmospheric pressure, and a cooling unit 68 that may cool the boosted intake air that may have been heated during compression in compressor 66. The compressor 66 may be, for example, an engine driven compressor or a component of an exhaust driven turbocharger 70. A cooling unit 68 may be, for example, an air-to-air aftercooler or an air-to-liquid aftercooler.

The exhaust system 58 also may include various components generally associated with an engine exhaust system. For example, exhaust system 58 may include an exhaust manifold 72 that may channel engine exhaust from one or more combustion chambers in engine 54 into an exhaust flow passage 74. The exhaust system 58 also may include one or more energy extracting devices, such as turbine 76, which may in turn drive one or more air pressurizing devices, such as the compressor 66. Additionally, various components particularly designed to control exhaust emissions, examples of which will be described below, may be associated with the exhaust system 58. The exhaust system 58 may extend from a location at which it is connected to engine 54, for example at exhaust manifold 72, to a position where exhaust is ultimately emitted to the environment, for example at exhaust opening 78.

The exhaust system 58 may be provided with an aftertreatment device that is designed to control exhaust emissions. An example of an aftertreatment device is filter assembly 80. The filter assembly 80 may include, for example, a particulate filter (not shown) which may remove soot and other particulates from exhaust gases. In the case of a diesel engine, the particulate filter may generally be referred to as a diesel particulate filter (DPF).

As the filter assembly 80 accumulates removed soot and other particulates, the filter assembly 80 may tend to become less efficient in its intended purpose. An accumulation of soot and other particulates in the filter assembly 80 also may tend to restrict the flow of exhaust gases and may affect engine operation.

One or more suitable diagnostic devices or sensors, such as diagrammatically illustrated sensor 82, for example, may monitor one or more parameters associated with the accumulation of soot and particulates in the filter assembly 80. Exemplary parameters that may be indicative of an accumulation of particulate matter in filter assembly 80 include temperature increase, pressure increase, and differential pressure across a particulate filter within the filter assembly 80. The sensor 82 may communicate with a suitable controller 90 designed and configured to monitor incoming signals and issue appropriate outgoing signals. Sensor 82 may send a signal to the controller 90 indicative of a condition in the filter assembly 80 that may be alleviated by maintenance, such as filter regeneration.

The exhaust system 58 may further include a regeneration assembly 92 suitably associated with the filter assembly 80. For example, the regeneration assembly 92 may be located upstream relative to the direction of exhaust flow from the filter assembly 80, and generally proximate to the filter assembly 80, in or proximate to the flow path of exhaust gases in the exhaust system 58. Regeneration assembly 92 may include a suitable combustion chamber 94 into which fuel and air may be introduced and ignited by a suitable ignition device, such as igniter 96. Heat generated by combustion within the regeneration assembly 92 may raise exhaust gases to a temperature sufficient to consume soot accumulated in the proximately situated the filter assembly 80.

Fuel for combustion within the regeneration assembly 92 may be introduced via at least one diagrammatically illustrated fuel injector unit 98. It will be understood that the fuel injector unit 98 may be any suitable injector or nozzle designed for and capable of injecting fuel into the combustion chamber 94 of the regeneration assembly 92. The illustrated embodiment includes a fuel pump 100 that supplies fuel (not shown) from a fuel input 102 from a fuel source (not shown). Flow from the fuel pump 100 through a conduit 104 to the injector unit 98 is controlled by a fuel valve 106. It also will be understood that there may be multiple injector units, and that the fuel injector unit 98 may include a single or multiple injectors or nozzles, which may be controlled by the controller 90.

Combustion air may be derived directly from ambient, the air intake system 56 of the engine 54, the exhaust system 58, and/or from a suitable compressor, and may include mixtures of the same. In the exemplary embodiment illustrated in FIG. 5, a source of combustion air may be delivered to regeneration assembly 92 via an air supply system 108. Combustion air for the regeneration assembly 92 may be derived via an airflow passage 110 shown connected to the intake airflow passage 62 at a location downstream from the compressor 66 so that the source of combustion air directed to the regeneration assembly 92 may include boosted air at a pressure somewhat above atmospheric pressure.

Delivery of combustion air via the airflow passage 110 may be suitably controlled with a flow control unit 112. In an exemplary embodiment, the flow control unit 112 includes a valve 114, although the flow control unit 112 may alternately include a plurality of air valves (not shown). The valve 114 is an on/off valve that is electrically actuated by a motor 116. While the valve 114 and motor 116 may be of any appropriate design, they may be, for example, as illustrated in FIGS. 2 and 3. As with the embodiment of FIG. 1, the valve 114/motor 116 communicate with and are controlled by the controller 90.

To ensure efficient operation of the regeneration assembly 92, accurate volumes of fuel and combustion air must be delivered to the combustion chamber 94, but the response time of the air valve 114 may be inhibited at low temperatures. According to the disclosure, if the controller 90 determines that the temperature is adequate to provide for accurate operation of the valve 114, when the controller 90 receives a signal commanding operation of the valve 114, the controller 90 will cause the valve 114 to operate normally, that is the valve 114 will operate as directed by the controller 90 during normal operation of the machine 50. In an embodiment, this may result in a positive current being supplied to pivot the valve 114 between its closed and open positions. In contrast, if the temperature signal indicates that the valve 114 is too cold to operate accurately, a warm up operation will be commanded.

In order to determine whether the valve 114 is sufficiently warm to provide accurate operation, one or more temperature sensors may be disposed within the machine 50 to provide a signal to the controller 90 that is indicative of the temperature of the valve 114 or the environment in which the valve 114 operates. While the sensors may be placed in any appropriate position, in the embodiment of FIG. 5, a plurality of sensors are provided, such that temperature readings may be taken at various positions within or without the machine 50.

By way of example only, a first temperature sensor 120 may be provided to determine the ambient temperature, a second temperature sensor 122 provided to determine the temperature of the engine coolant, and a third temperature sensor 124 provided to determine the temperature of fuel to be injected into the regeneration assembly 92. The sensors 120, 122, 124 may be disposed in any appropriate location to determine the associated temperature and provide a signal indicative of the temperature to the controller 90. For example, the first temperature sensor 120 may be provided within or without the machine 50. The second temperature sensor 122, for example, may be disposed on a portion of the engine 54 adjacent a cooling chamber (not shown in detail), or within fluid contained within the cooling chamber. Similarly, the third sensor 124 may be disposed within a fuel tank (not shown) or on the fuel pump 100.

Further, in order to ensure that the regeneration assembly 92 is operative only if the engine 54 is running, an engine run sensor 126 may be provided, which is coupled, for example, to the output shaft 128 of the engine 54. As with the sensors 120, 122, 124, the engine run sensor 126 provides a signal to the controller 90, in this case, indicative of whether or not the engine 54 is running.

In the exemplary embodiment illustrated in FIG. 5, the controller 90 may be connected by suitable lines, illustrated as dotted lines in FIG. 5, to the various diagnostic devices, valves, and other components to be monitored and/or controlled. The controller 90 may include a computer supplied with suitable algorithms, programs, and/or control strategies designed to effectuate efficient operation of the machine and system components. For example, controller 90 may be a suitable engine control module (ECM), typically associated with modern engines. It will be understood that all communications between the controller 90 and the machine and system components also may be achieved with a suitable wireless communication system.

Turning now to FIG. 6, a method of controlling the valve 114 is illustrated in the form of a flow chart. In this embodiment, if the valve 114 is deemed to be adequately warm, it is allowed to operate in a normal mode, that is, a first closing current is supplied to the motor 116 to operate the valve 114. Conversely, if a plurality of temperature parameters are met, in order to warm the valve 114, the controller 90 commands that a second closing current is supplied to the motor 116, that is, the controller 90 commands that a negative current provided to the motor 116 in order to warm the associated valve 114.

As shown in FIG. 6, a temperature signal indicative of the ambient temperature is provided from the first temperature sensor 120 to the controller 90. If the ambient temperature indicates that the environment is sufficiently warm that the valve 114 would operate accurately, then there would be no need to warm the valve 114 prior to operation. Accordingly, if the ambient temperature indicated by the ambient temperature signal is greater than a first preset temperature parameter, then the controller 90 will command a normal operation of the motor 116 to allow normal operation of the valve 114. Conversely, if the ambient temperature indicated by the ambient temperature signal is less than or equal to the first preset temperature parameter, then the controller 90 further evaluates whether a warm up operation of the motor 116 is appropriate.

In a similar operation, the second and third temperature sensors 122, 124 provide temperature signals indicative of the temperature of the engine coolant and the fuel, respectively, to the controller 90. If both the engine coolant temperature indicated by the engine coolant temperature signal is greater than a second preset temperature parameter, and the fuel temperature indicated by the fuel temperature signal is greater than a third preset temperature parameter, then the controller 90 will command a normal operation of the motor 116 to provide normal operation of the valve 114. Conversely, however, if either of the engine coolant temperature indicated by the engine coolant temperature signal is less than or equal to the second preset temperature parameter, or the fuel temperature indicated by the fuel temperature signal is less than or equal to the third preset temperature parameter, then the controller 90 will further evaluate whether a warm up operation of the motor 116 is appropriate.

Finally, the engine run sensor 126 provides an engine run signal to the controller that is indicative of whether or not the engine 54 is running. If the engine run signal indicates that the engine 54 is not running, then the controller 90 will not activate the motor 116. Conversely, if the engine run signal indicates that the engine 54 is running, then the controller 90 will provide a second closing current, i.e., a negative current, to activate the motor 116 for a preset period of time to warm the valve 114.

In other words, if the ambient temperature indicated by the ambient temperature signal is less than or equal to the first preset temperature parameter, and either the engine coolant temperature indicated by the engine coolant temperature signal is less than or equal to the second preset temperature parameter or the fuel temperature indicated by the fuel temperature signal is less than or equal to the third preset temperature parameter, and the engine run signal indicates that the engine 54 is running, then the controller 90 will activate the motor 116 for warm-up for a preset period of time. In other words, the controller 90 will command a closing current at or above nominal values to activate the motor 116 for a preset period of time to warm the valve 114.

As explained with regard to the embodiment of FIGS. 1 and 4 and the valve 12, 114 illustrated in FIGS. 2 and 3, if a warm up operation is commanded, the controller 90 causes a negative current to be supplied to the motor 116 such that the motor 116 attempts to rotate the already closed valve flap 30 toward the closed position, rather than the open position (see FIGS. 2 and 3). As the flap 30 bears against the stops 34, 36, the motor 116 heats up the motor housing 21. This heat is transferred to the valve body 26 to heat the valve body 26 along with any associated lubricant, such as oil or grease (not shown) that may act to provide accurate operation of the valve 114. In order to prevent damage to the motor 116, the negative current is supplied to the motor 116 for a limited, preset period of time.

INDUSTRIAL APPLICABILITY

The response time of valves that are utilized to control the passage of fluid or gas for various operations may operate dramatically slower in extremely cold weather as the viscosity of the grease or lubricant in a valve increases with lower temperature. This may result in inefficiencies and even error in the systems associated with the valves. The present disclosure may be applied to increase the temperature of the body of such a valve, reducing the viscosity of the grease or lubricant in the valve to provide improved response time.

In a valve utilized to control the amount of air supplied to a burner to facilitate combustion to regenerate a diesel particulate filter, for example, the response time of the valve may become sluggish at low temperatures. This sluggish operation may increase the response time such that the resulting mixture of combustion air and fuel is too rich, inhibiting ignition, or even preventing an associated diesel particulate filter burner from lighting. As a result, when operating machines utilizing such regeneration assemblies in extremely cold conditions, the engine must typically be allowed to warm up before allowing diesel particulate filter regeneration. The present disclosure may be applied in such an arrangement to allow regeneration sooner after starting the engine. In this way, application of the present disclosure may extend the range of regeneration conditions in cold weather.

The present disclosure may be utilized to accelerate the response time of the valve used to control the flow of a fluid or gas within a machine, and, more specifically, a combustion engine. By commanding an increased negative current to close the valve 12, 114 against its mechanical stops 34, 36, the heat from the stalled motor 20, 116 can be used to warm-up the housing of the valve 12, 114, and, accordingly, the lubricant contained therein. In the case of a combustion air valve 12, 114, for example as the valve 12, 114 remains closed during the warm up, it inhibits the passage of air from the compressor 66, minimizing boost leaks.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A control system in a machine having an internal combustion engine, the control system comprising:
    a valve having an open position and a closed position;
    a motor coupled to the valve and operable to open and close the valve, the motor having a nominal operating current;
    a temperature sensor adapted to supply a temperature signal; and
    a controller in electrical communication with the motor and adapted to receive the temperature signal, the controller being configured to supply a closing current to the motor for a preset period of time when the temperature signal is indicative of a temperature no greater than a given temperature parameter, the closing current being at or above the nominal operating current, the closing current to the motor being supplied when the valve is in the closed position.

2. The control system of claim 1, wherein the valve includes a lubricant, and the temperature sensor is disposed to measure ambient temperature.

3. The control system of claim 1, wherein the temperature sensor is disposed to measure at least one of ambient temperature, fuel temperature, and coolant temperature.

4. The control system of claim 1, wherein the motor is a stepper motor.

5. The control system of claim 1, wherein the valve is an air valve.

6. The control system of claim 1, wherein the valve is an exhaust gas regeneration valve.

7. The control system of claim 1, wherein the valve is adapted to regulate a flow of combustion gas to a regeneration assembly.

8. The control system of claim 1, further including
a first temperature sensor adapted and disposed to measure ambient temperature and supply an ambient temperature signal to the controller; and
at least one of
a second temperature sensor adapted and disposed to measure engine coolant temperature and supply an engine coolant temperature signal to the controller; and
a third temperature sensor adapted and disposed to measure fuel temperature and supply a fuel temperature signal to the controller; and
wherein the controller is configured to supply the closing current to the motor if the ambient temperature signal indicates an ambient temperature less than or equal to a first preset value, and if at least one of the engine coolant temperature signal and the fuel temperature signal indicates an engine coolant temperature or fuel temperature less than or equal to second and third preset values, respectively.

9. A machine comprising:
an internal combustion engine;
an exhaust gas regeneration assembly;
a gas supply; and
the control system of claim 1.

10. The machine of claim 9, wherein the temperature sensor is disposed to measure at least one of ambient temperature, fuel temperature, and coolant temperature.

11. The machine of claim 9, further comprising
a first temperature sensor adapted and disposed to measure ambient temperature and supply an ambient temperature signal to the controller; and
at least one of
a second temperature sensor adapted and disposed to measure engine coolant temperature and supply an engine coolant temperature signal to the controller; and
a third temperature sensor adapted and disposed to measure fuel temperature and supply a fuel temperature signal to the controller; and
wherein the controller is configured to supply the closing current to the motor if the ambient temperature signal indicates an ambient temperature less than or equal to a first preset value, and if at least one of the engine coolant temperature signal and the fuel temperature signal indicates an engine coolant temperature or fuel temperature less than or equal to second and third preset values, respectively.

12. A method of controlling a valve in a machine having an internal combustion engine, the valve having an open position and a closed position, the method comprising the steps of:
providing a motor coupled to the valve, the motor being operable to open and close the valve, and having a nominal operating current;
sensing a temperature and supplying a temperature signal indicative of said temperature to a controller;
supplying a closing current to the motor for a preset period of time when the valve is in the closed position and the temperature signal is indicative of a temperature no greater than a preset temperature parameter, the closing current being at or above the nominal operating current.

13. The method of claim 12, wherein the supplying a closing current step includes supplying a negative closing current.

14. The method of claim 12, further including the step of disposing the valve to control a flow of gas.

15. The method of claim 12, wherein the step of providing a motor includes the step of providing a stepper motor.

16. The method of claim 12, further including the step of operating the motor and valve in a normal mode of operation when the temperature signal is indicative of a temperature greater than the preset temperature parameter.

17. The method of claim 12, further including the steps of
sensing an ambient temperature and supplying an ambient temperature signal to a controller, and
at least one of
sensing an engine coolant temperature and supplying an engine coolant temperature signal to the controller, and
sensing a fuel temperature and supplying a fuel temperature signal to the controller,
the step of supplying a closing current including the step of supplying the closing current to the motor if
the ambient temperature signal indicates an ambient temperature no greater than a first preset temperature parameter, and
if at least one of
the engine coolant temperature signal indicates an engine coolant temperature no greater than a second preset temperature parameter, or
the fuel temperature signal indicates a fuel temperature no greater than a third preset temperature parameter.

18. The method of claim 17, further including the step of operating the motor and valve in a normal mode of operation when the ambient temperature signal is indicative of a temperature greater than the first preset temperature parameter, or when the engine coolant temperature signal is indicative of an engine coolant temperature greater than the second preset temperature parameter and the fuel temperature signal indicates a fuel temperature greater than the third preset temperature parameter.

19. The method of claim 17, further including the step of disposing the valve to control a flow of gas to an exhaust gas regeneration assembly.

20. The method of claim 12, wherein the step of supplying a closing current includes the step of maintaining the closing current for a period of time sufficient for the motor to warm lubricant contained within the valve.

* * * * *